Dec. 19, 1961  K. VÖGTLIN ET AL  3,013,854
TACHOGRAPH FOR AUTOMOTIVE VEHICLES
Filed Nov. 3, 1958  2 Sheets-Sheet 1
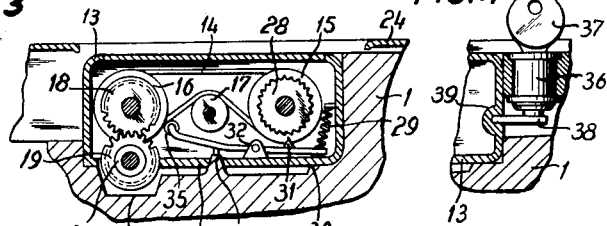
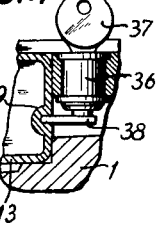
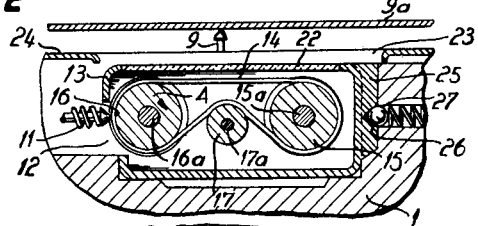
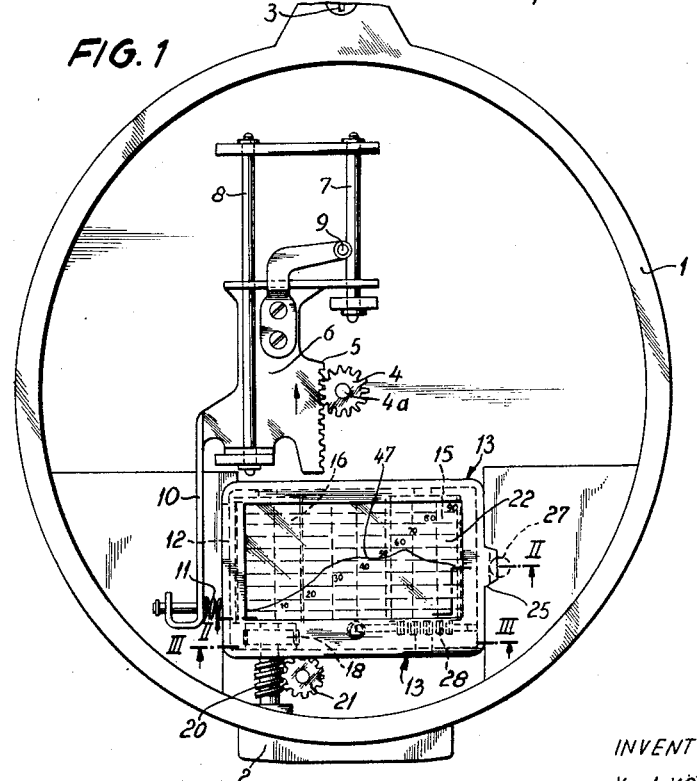
INVENTORS
Karl VÖGTLIN
Norbert HELMSCHROTT
BY MICHAEL S. STRIKER
ATTORNEY Dec. 19, 1961  K. VÖGTLIN ET AL  3,013,854
TACHOGRAPH FOR AUTOMOTIVE VEHICLES
Filed Nov. 3, 1958  2 Sheets-Sheet 2
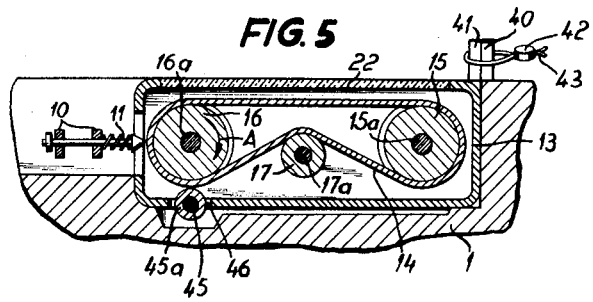
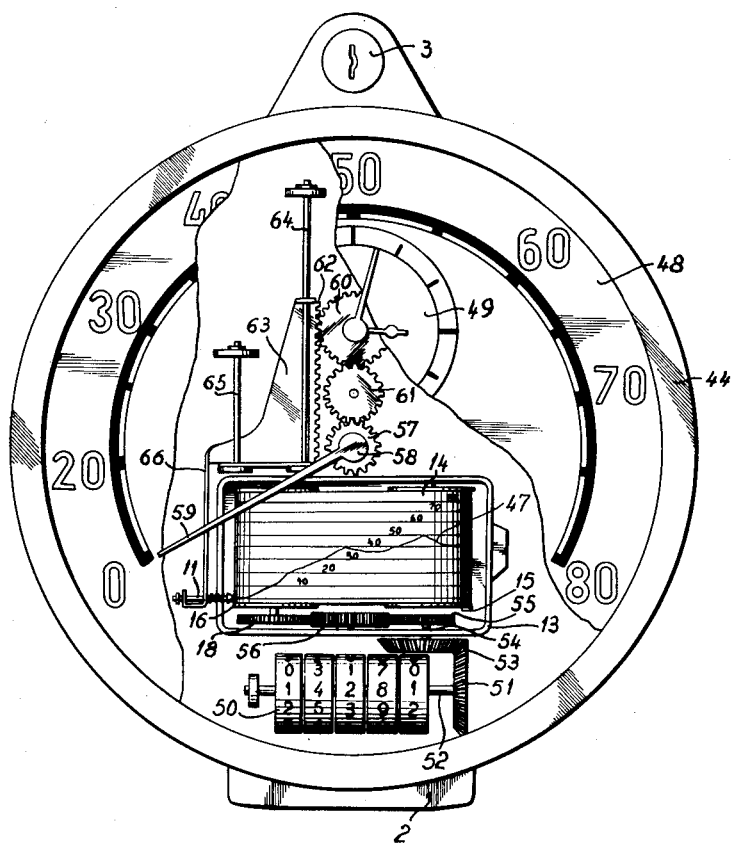
INVENTORS:
Karl VÖGTLIN
Norbert HELMSCHROTT
BY MICHAEL S. STRIKER
ATTORNEY

United States Patent Office 3,013,854
Patented Dec. 19, 1961

3,013,854
TACHOGRAPH FOR AUTOMOTIVE VEHICLES
Karl Vögtlin, Villingen, Schwarzwald, and Norbert Helmschrott, Schwenningen, Neckar, Germany, assignors to Firma Kienzle Apparate G.m.b.H., Villingen, Schwarzwald, Germany
Filed Nov. 3, 1958, Ser. No. 771,322
Claims priority, application Germany Nov. 4, 1957
26 Claims. (Cl. 346—18)

The present invention relates to tachographs for automotive vehicles, especially to tachographs of the type adapted to record the speed, distances covered, driving times and idling times of a conveyance.

In certain types of known tachometers, the record receiving element or chart is driven at a rate proportional with units of time and at relatively low rotational speed. The record receiving element is preferably of discoid shape and customarily performs a full revolution within each 24-hour period. The speed recordings as well as other information compiled by the tachograph on such slowly revolving discoid elements are rather condensed. Because the data recorded on the disc cover a relatively long period of time, the so compiled information is of utmost importance for evaluation of general driving habits of an operator.

When the data compiled by such record receiving elements are evaluated subsequent to an accident, they must be examined by experts who usually secure an enlarged reproduction thereof, especially of that portion of a record receiving element which carries the information recorded shortly before the advent of an accident. Thus, the recordals made on a relatively slowly rotating discoid body do not permit an examination immediately at the locale of an accident and hence do not provide inmmediate information as to the events shortly preceding and presumably leading to the accidents.

In another type of known tachographs, the record receiving element is driven at a higher speed, either in dependency on units of time or at a rate proportional with mileage covered by the conveyance, to record a relatively large and readily readable curve illustrative of the speed and of certain other performances of the conveyance during the measured period of time or during the period in which the vehicles has covered a certain distance. In such types of tachographs, the speed indicating recordals in the form of curves are customarily erased or wiped off in fully automatic manner at regular and rather frequent intervals. Such instruments, of course, are primarily designed as a means for revealing the causes of accidents because they are capable of keeping records covering only a short period of time. Thus they cannot present a comprehensive picture as to the driving habits of an operator such as would require evaluation of data covering an extended time period.

An important object of the present invention is to provide an improved tachograph which permits on-the-spot examination of all data covering the driving habits of an operator.

Another object of the invention is to provide a tachograph embodying a record receiving element on which the information is recorded at such scale as to enable persons of average experience to perform an immediate examination of data relating to performance of a conveyance preceding an accident in which the conveyance equipped with such tachograph might become involved.

A further object of the invention is to provide a tachograph in which the record receiving means is so installed as to prevent wilful erasures or falsifications of recorded information.

A still further object of the instant invention is to provide a tachograph in which the record erasing means is automatically separated from the record receiving element when the latter is removed from the tachograph housing.

A yet further object of our invention is to provide in a tachograph arresting means for the record receiving element which becomes effective automatically when the record receiving element is removed from the tachograph housing.

A yet further object of the invention is to provide a tachograph of above outlined characteristics which is extremely simple, reliable in operation, which occupies little space, and which is so constructed as to prevent insertion therein of an unsuitable record receiving element.

An additional object of the invention is to provide a tachograph which is so constructed that the driver of a conveyance may at all times read data recorded on the record receiving element thereof.

A further object of the invention is to provide means for locking the record receiving element into the tachograph housing.

A concomitant object of our invention is to so improve tachographs of known construction that they permit on-the-spot determination of data pertaining to a driver's conduct shortly before an accident in addition to separately recording the speed, distances covered, times of actual use and times of non-use covering a considerable period of time.

The above and certain other objects of the invention are attained by the provision of a tachograph which, in addition to the customary slowly advancing record receiving element, embodies or is capable of receiving a second record receiving element, preferably driven at a relatively high speed and equipped with suitable automatic record eradicating means. The novel assembly further comprises means, combined with the speedometer, for making automatic speed recordings not only on the relatively slowly advancing record receiving element but also on the rapidly moving second record receiving element while the latter rotates either at a rate proportional with selected units of time, i.e. under the influence of a suitable clockwork mechanism, but preferably at a rate proportional with unit distances covered by the conveyance in which the improved instrument is installed. Thus, the speedometer, in addition to the customary speed indicating and/or recording member, such as a suitable stylus, carries or is operatively connected with a second recording member or stylus which is in permanent contact with a relatively rapidly advancing record receiving element, the latter preferably assuming the form of an endless band or strip installed in a suitable receptacle which is removably insertable into the tachometer housing. The receptacle of the endless band or record receiving element may be made either entirely or partly of a transparent or translucent material and thus enables the operator to at all times immediately obtain readings pertaining to various data recorded on the band. In addition, due to the partial or full transparency of receptacle for the relatively rapidly advancing band, the latter need not be removed from the tachograph in the event of an accident when the person or persons inspecting the conveyance have ready access to the instrument panel in which the tachograph is usually installed. Instead of being mounted in the housing, the record receiving band and its receptacle may be installed in the cover of the tachograph or the cover, too, may be formed with a transparent or translucent zone to permit observation of recordals made on the band.

The operative connection between recording members cooperating with the respective slowly and rapidly rotating record receiving elements of our improved tachograph preferably, and in its simplest form, consists of a sliding carriage which is properly guided in tachograph housing for movements imparted thereto by the speedometer. The carriage is preferable formed with an extended arm on which the recording member for rapidly advancing record receiving element is mounted in a position adjacent to and in contact with the band when the latter's receptacle is properly inserted in the tachograph housing. To that end, the receptacle for the endless band is formed with a suitable aperture or cutout through which the corresponding recording member extends.

It is very desirable to provide a tachograph with means for positively preventing wilful falsifications or erasures of data recorded on the record receiving elements. According to a feature of our invention, any unauthorized alterations or erasures of recorded data are prevented in that the rapidly advancing record receiving element is combined with arresting means which becomes active only at such times when the receptacle which houses the record receiving element is removed from the tachograph housing. When the removable receptacle contains a record receiving element in the form of an endless band, one of rollers over which the band travels is positively prevented from performing any type of movement by a suitable arresting member. The latter may assume the shape of a pawl acting against a ratchet wheel, mounted for rotation with the aforementioned roller, when the receptacle for the record receiving band is removed from the tachograph housing. The pawl is biased by a constantly acting spring which tends to move the former into engagement with the ratchet wheel. The pawl may also carry an erasing or record removing element, such as a suitably treated roller, which is automatically moved away from contact with the record receiving band whenever the receptacle in which the band is mounted is removed from the tachograph housing.

According to a slight modification of our invention, the record erasing means in the form of a roller or the like may be installed in the tachograph housing proper to be automatically separated from the band when the latter is removed from the tachograph. In this construction, the receptacle for the band is formed with a suitable cutout or aperture through which the erasing means extends into contact with the band when the latter is properly installed in the instrument. The erasing means is preferably rotated by means which advances the record receiving band and thus cannot be used for wilful erasures of recorded data either in inserted or removed position of the band.

Unauthorized removal of rapidly advancing record receiving element from the tachograph may be prevented by the provision of lock means, such as a spring biased ball receivable in a suitable socket provided in the receptacle of record receiving element, or a customary lock and key assembly. The lock means may also comprise a lead-sealed wire or the like.

A further feature of the invention resides in the provision of means for preventing insertion of an unsuitable record receiving element into a tachograph with a given measuring range. To that end, the receptacle for the record receiving element may be formed with one or more extensions or ribs formed with a socket or recess for reception of aforementioned lock means, such as a spring-biased ball or a sliding bolt operable by a key from the outside, the socket being so positioned as to permit entry of lock means only when the record receiving element is inserted into appropriate tachograph housing. In other words, the lock means in different types of tachographs, i.e. in tachographs with different measuring ranges, are located in different zones so as only to permit insertion of record receiving elements which are specifically designed for use with a given type of tachograph.

The scales indicating the momentary speed of, or the mileage covered by, the conveyance may be applied directly to the cover of the tachograph housing or to the top plate of receptacle in which the rapidly advancing record receiving element is mounted.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawings, in which:

FIG. 1 is top plan view of the tachograph housing with the cover removed;

FIGS. 2 and 3 are sections taken, respectively, on lines II—II and III—III in FIG. 1, as seen in the direction of arrows;

FIG. 4 illustrates a different type of locking means for the receptacle of rapidly advancing recording strip;

FIG. 5 is a section through the receptacle of record receiving element which is combined with a modified erasing means and is lead-sealed to the tachograph housing; and FIG. 6 illustrates a further modification in which the receptacle of the record receiving means is connected directly with the cover of tachograph housing.

The tachograph shown in FIG. 1 comprises a housing or frame 1 which may be built into the instrument panel of an automotive vehicle, not shown. The top or open side of housing 1 is sealed by a cover or lid 44, shown in FIG. 6, which is pivotally connectable thereto by a hinge 2 and is normally held in closed position by a locking device 3.

Tachograph frame 1 houses various measuring instruments, such as a speedometer in the form of a centrifugal pendulum or of an eddy current speed measuring system, a vibrating pendulum for recordal of driving and idling times, as well as a mileage recording member or stylus. Only a shaft 4a of the speedometer is shown; it carries a gear 4 which meshes with a toothed rack 5 forming part of a sliding carriage 6 to displace the latter at a rate proportional with the speed of automotive vehicle in which the improved tachograph is installed.

Carriage 6 is slidably mounted on a pair of parallel guide rods 7 and 8, and carries the customary speed recording member or stylus 9. The point of stylus 9 is in contact with a slowly rotating record receiving disc 9a, shown in FIG. 2, to record thereon data pertaining to the speed of conveyance and covering a period of, say, 24 hours during which the discs 9a describes a full revolution. The clockwork or other mechanism which rotates member 9a is not shown as it may be of any conventional design. Disc 9a is installed in the tachograph housing 1 in the zone covering the upper half thereof, reference being had to FIG. 1.

A spring-biased second recording member or stylus 11 is slidably mounted in an extension or arm 10 of carriage 6 and projects through a cutout or slot 12, best shown in FIG. 2, of a removable receptacle or box 13 which latter houses a second record receiving element in the form of an endless band or chart 14. Recorder chart 14 travels about a pair of parallel rollers 15, 16 rotatably mounted on respective shafts 15a, 16a in receptacle 13, and is kept under requisite tension by a tensioning roller 17 rotating on a shaft 17a mounted in receptacle 13. One end of roller 16 is rigidly connected with a gear 18 which meshes with a second gear 19 rotatably mounted in housing 1, as is best shown in FIG. 3. Gear 19 is coaxial with and is rigidly connected to a worm 20 on shaft 45 which latter is installed in housing 1; member 20 is driven by a worm wheel 21 forming part of means rotating at a rate proportional with the distance covered by the automotive vehicle or by a clockwork mechanism.

Receptacle 13 for endless recording chart or band 14 may be made in part or entirely of transparent or translucent material. The embodiment shown in FIG. 2 comprises only a cover or top plate 22 of transparent material which can be observed through a cutout or opening 23 formed in a top plate or shield 24 which covers the measuring instruments installed in tachograph housing 1. Thus, the top part or zone of endless band 14 between rollers 15 and 16 is readily observable by the driver enabling him to at all times read and control the speed of his conveyance. In addition, the recordals made by stylus 11 on sheet 14 traveling over rollers 15 and 16 in the direction of arrow A (FIG. 2) may be photographed without requiring removal of receptacle 13 or of band 14 from the latter. This, as before mentioned, is quite important in cases of accidents when an on-the-spot determination of various data pertaining to the operation of conveyance just before the accident must be made.

The right-hand side of receptacle or insert 13 is formed with a guide rib or extension 25 defining therein a recess or socket 26 for reception of a locking or arresting member, such as a spring-biased ball 27. The latter is installed in a suitable bore formed in housing 1 and enters into the recess 26 when the receptacle 13 is properly installed. In order to prevent insertion of an unsuitable receptacle 13, the guide means 25 with recess 26 as well as the ball 27 of different types of tachographs are located in different zones of members 13 and 1, respectively. Thus, only a selected receptacle 13 may be inserted into a tachograph with a given measuring range.

Arresting means 25—27 may be replaced by a regular lock and key assembly, such as is shown in FIG. 4. The body of a lock 36 is built into housing 1 and is operable by a key 37. A locking bar 38 is rotatable by member 37 to enter into or to be removed from, a recess 39 formed in the adjacent wall of receptacle 13. Again, in different types of tachographs and receptacles 13 therefor, locking assembly 36—38 and recess 39, respectively, are located at different non-complementary points in order to prevent insertion of an unsuitable recorder strip 14.

Roller 15 is rigidly fixed to a ratchet wheel 28, best shown in FIG. 3, which latter is controllable by a two-armed lever or lock pawl 30 biased by a spring 29. One end of resilient member 29 is connected with the right-hand arm of pawl 30, and its other end is anchored in a bracket forming part of, or connected with, the receptacle 13. The right-hand arm of pawl 30, which latter is swingable about a pivot axle 32, carries a tooth 31 engaging with the teeth of ratchet wheel 28 whenever the spring 29 is free to pivot member 30 in anticlockwise direction. Tooth 31 is kept at a distance from toothed member 28 by a projection or extension 33 of housing 1 which abuts against the left-hand arm of pawl 30 when the receptacle 13 is properly installed in housing 1. To that end, the receptacle is formed with a cutout or aperture 34 through which the projection 33 extends. The free end of left-hand arm of pawl 30 carries an eraser or record remover 35 which is in contact with endless strip 14 at a point relatively close to the stylus 11. Thus, the curve drawn by member 11 on strip 14 is erased or washed out by preferably roller-shaped member 35 shortly before an imprinted or record-bearing zone of the strip completes a full lap in the endless path about rollers 15 and 16.

When the receptacle 13 is removed from housing 1, projection 33 is separated from the left-hand arm of pawl 30 and spring 29 is free to pivot the latter in such manner (anticlockwise) that the tooth 31 engages with teeth of ratchet wheel 28 and prevents rotation of roller 15, thus stopping the endless band 14. Spring 29 also causes simultaneous removal of eraser means 35 from contact with strip 14. When the receptacle 13 is reinserted into housing 1, all parts return into the position of FIG. 3 due to engagement of pawl 30 with projection 33, and the worm wheel 21 is again free to rotate the roller 16 over worm 20, gear 19, and gear 18 which latter, too, is returned into mesh with member 19.

According to a modification of our invention which is shown in FIG. 5, eraser means 35 is replaced by a roller 45a coaxially mounted on the axle 45 of worm 20 in housing 1 and extending through a suitable cutout 46 in receptacle 13 into contact with strip 14 when the receptacle 13 is installed in member 1. In this embodiment, the point of erasure is even closer to the stylus 11 and the recorded curve 47 (see FIG. 1) remains on strip 14 for a longer period of time. This arrangement also prevents wilful erasure of curve recorded on strip 14 since the erasing roller 45a is connected for rotation with the mileage recording means of the conveyance. The curve 47 recorded on strip 14 cannot be wiped off when the receptacle 13 is taken out of housing 1 because the erasing roller 45a, installed in said housing, is not removed with the receptacle.

FIG. 5 also illustrates a modification of locking means 25—27 or 36—39 shown in FIGS 2 and 4, respectively. It comprises a pair of brackets or lugs 40, 41 connected to or integral with parts 1, 13, respectively, and a lead seal 42 or wire 43 passing through aligned apertures in members 40 and 41. Only the lug 41 of a selected receptacle 13 can be aligned with the lug 40 on housing 1 of tachographs with a given measuring range.

The composition of and the printed matter carried by endless strip 14, as well as the composition of eradicating substance on roller 35 or 45a may be of any known type, and thus need not be described in greater detail.

In FIG. 6, finally, the receptacle 13 is directly connected with the cover or lid 44 of the tachograph.

This lid 44 has mounted therein the usual speedometer scale 48 and a time scale 49, as well as a distance counter 50 consisting of a number of counting rollers.

The speedometer scale 48 is shown in the drawings as partially cut away to make visible the receptacle 13 removably fastened on the back of the speedometer scale 48.

In order that the endless strip 14 and its curve 47 may be visible from the front, the speedometer scale 48 is formed with a cut-out-portion (not shown in FIG. 6), through which the latter can be observed.

In order to drive the endless strip 14 in dependance on distance units covered by the vehicle, there is a bevel gear 51 mounted on the drive shaft 52 of the distance counter 50. This bevel gear 51 meshes with another bevel gear 53 fixed on the shaft 54, which is mounted for rotational movement in the receptacle 13 and which carries inside this receptacle a toothed wheel 55 meshing with an intermediate wheel 56. This intermediate wheel 56 drives the wheel 18 mounted on shaft 16a thereby driving roller 16.

In order to operate the speed registering stylus 11 there is provided a toothed wheel 57 mounted on the speed indicator shaft 58, which carries the speed indicator hand 59. Shaft 58 is connected to shaft 4a of FIG. 1 by means of a coupling mechanism as shown for instance in the French Patent 841,466. Wheel 57 drives a wheel 60 over the intermediate wheel 61. Wheel 60 engages the rack portion 62 on the carriage 63, which is mounted for movement up- and downwards on guide bars 64, 65. At its lower end the carriage 63 is formed with an extension or arm 66, carrying the stylus 11.

It will be obvious that in this case the endless strip 14 is moved by the vehicle movement via the distance counter 50, whereas the speed recording stylus 11 is moved through the speed indicator shaft over appropriate transmission gearings, so that the stylus 11 draws curve 47 on endless strip 14.

Without further analysis the foregoing will so fully reveal the gist of the present invention that others can by applying current knowledge readily adapt it for various applications without omitting features that, from the standpoint of prior art, fairly constitute essential characteristics of the generic and specific aspects of this

What is claimed as new and desired to be secured by Letters Patent is:

1. A tachograph for an automotive vehicle comprising, in combination: speedometer means; a pair of recording members connected with and movable by said speedometer means; a pair of record receiving elements each in contact with one of said recording members; means for continuously rotating one of said record receiving elements at a low constant speed; means for rotating the other of said record receiving elements at a higher variable speed proportional with units of distance covered by the vehicle; and stationary means in contact with said other record receiving element for erasing from the latter recordals made thereon by the respective recording member.

2. A tachograph for an automotive vehicle comprising, in combination: speedometer means; a first recording member and a second recording member operatively connected with and movable in unison by said speedometer means; a disc continuously rotating at a constant and relatively low speed and in contact with said first recording member whereby the latter records on the disc a curve indicative of the speed measured by said speedometer means; an endless record receiving band in contact with said second recording member; means for advancing said band in an endless path at a higher variable speed proportional with units of distance covered by the vehicle whereby the second recording member records a curve on said band indicative of the speeds measured by said speedometer means; and stationary means in contact with said band for erasing therefrom said last mentioned curve.

3. A tachograph for an automotive vehicle comprising, in combination: a housing; speedometer means in said housing; a first and a second recording stylus operatively connected with and movable by said speedometer means in said housing; a disc in said housing continuously rotating at a constant low angular speed and in contact with said first stylus whereby the latter records on the disc a curve indicative of the speeds measured by said speedometer means; a receptacle removably received in said housing and having an aperture; an endless band in said receptacle; means operatively connected with said band for advancing same in an endless path at a higher variable speed proportional with units of distance covered by the vehicle; said second stylus extending through said aperture and contacting said band for recording thereon a curve indicative of the speeds measured by said speedometer means; and means mounted in said receptacle and in contact with said band for erasing therefrom said last mentioned curve.

4. A tachograph for an automotive vehicle comprising, in combination: a housing; speedometer means in said housing; a first and a second recording stylus operatively connected with and movable by said speedometer means in said housing; a disc continuously in said housing rotating at a low constant angular speed and in contact with said first stylus whereby the latter records on the disc a curve indicative of the speeds measured by said speedometer means; a receptacle removably received in said housing and having a first and a second aperture; an endless band in said receptacle; means operatively connected with said band for advancing same in an endless path at a higher variable speed proportional with units of distance covered by the vehicle; said second stylus extending through said first aperture and contacting said band for recording thereon a curve indicative of the speeds measured by said speedometer means; and means mounted in said housing and extending through said second aperture into contact with said band for erasing therefrom said last mentioned curve.

5. A tachograph for an automotive vehicle comprising, in combination: a housing having a cover adapted to support a clockwork; speedometer means in said housing; a first and a second stylus operatively connected with and movable by said speedometer means in said housing; a disc mounted on said cover and adapted to be continuously driven by said clockwork to rotate at a constant low angular speed and in contact with said first stylus whereby the latter impresses thereon recordings indicative of speeds measured by said speedometer means; a receptacle connected with the cover in said housing and having an aperture; an endless band in said receptacle; means operatively connected with said band for advancing same at a higher variable speed proportional with the units of distance covered by the vehicle; said second stylus extending through said aperture and contacting the band for recording thereon a curve indicative of the speeds measured by said speedometer means; and stationary means in contact with said band for erasing said curve therefrom.

6. A tachograph for an automotive vehicle comprising, in combination: a housing having an at least partly transparent cover; speedometer means in said housing; a first and a second stylus operatively connected with and movable by said speedometer means in said housing; a disc in said housing continuously rotating at a constant low angular speed and in contact with said first stylus whereby the latter impresses thereon recordings indicative of speeds measured by said speedometer means; a receptacle connected with the cover in said housing and having an aperture; an endless band so installed in said receptacle that at least a portion thereof is observable through said cover; means operatively connected with said band for advancing same at a higher variable speed proportional with the units of distance covered by the vehicle; said second stylus extending through said aperture and contacting the band for recording thereon a curve indicative of the speeds measured by said speedometer means, said band advancing in a direction from said second stylus and adjacent to said cover whereby said curve is observable through said cover; and stationary means in contact with said band at a point adjacent to said second stylus for erasing said curve before a record-bearing portion of the band can return into contact with said stylus.

7. A tachograph for an automotive vehicle comprising, in combination: a housing; speedometer means in said housing; a first and a second recording stylus operatively connected with and movable by said speedometer means in said housing; a disc in said housing continuously rotating at a constant low angular speed and in contact with said first stylus whereby the latter records on the disc a curve indicative of the speeds measured by said speedometer means; a receptacle of at least partly transparent material removably received in said housing and having an aperture; an endless band in said receptacle; means operatively connected with said band for advancing same in an endless path at a higher variable speed proportional with units of distance covered by the vehicle; said second stylus extending through said aperture and contacting said band for recording thereon a curve indicative of the speeds measured by said speedometer means; and means mounted in said receptacle and in contact with said band for erasing therefrom said last mentioned curve.

8. A tachograph for an automotive vehicle comprising, in combination: a housing having a cover; speedometer means in said housing; a first and a second stylus operatively connected with and movable by said speedometer means in said housing; a disc in said housing continuously rotating at a relatively slow constant angular speed and in contact with said first stylus whereby the latter records thereon a curve indicative of speeds measured by said speedometer means; a receptacle having a transparent plate and removably received in said housing in such manner that the plate is adjacent to said cover, said receptacle having an aperture; an endless band in said receptacle having a zone adjacent to said plate; means operatively connected with said band for advancing same at a variable speed greater than the speed of said disc and proportionate with the distances covered by the vehicle; the second stylus extending through said aperture into contact with said band for recording thereon a curve indicative of the speeds measured by said speedometer means; and means in contact with the band for erasing said last mentioned curve at a point in advance of the point where the band contacts said second stylus.

9. A tachograph for an automotive vehicle comprising, in combination: a housing having an at least partly transparent cover; speedometer means in said housing; a first and a second stylus operatively connected with and movable by said speedometer means in said housing; a disc in said housing rotating at a relatively slow constant angular speed and in contact with said first stylus whereby the latter records thereon a curve indicative of speeds measured by said speedometer means; a receptacle having a transparent plate and removably connected with said cover in such manner that the plate is adjacent to said cover, said receptacle having an aperture; an endless band in said receptacle having a zone adjacent to said plate; means operatively connected with said band for advancing same at a higher variable speed proportional with the units of distance covered by said vehicle; the second stylus extending through said aperture into contact with said band for recording thereon a curve indicative of the speeds measured by said speedometer means; and means in contact with the band for erasing said last mentioned curve at a point in advance of the point where the band contacts said second stylus.

10. A tachograph for an automotive vehicle comprising, in combination: speedometer means; a carriage operatively connected with and movable by said speedometer means; a pair of recording members connected with said carriage; a pair of record receiving elements each in contact with one of said recording members; means for continuously rotating one of said record receiving elements at a constant low speed; means for rotating the other of said record receiving elements at a higher variable speed proportional with units of distance covered by the vehicle; and stationary means in contact with said other record receiving element for erasing from the latter recordals made thereon by the respective recording member.

11. A tachograph for an automotive vehicle comprising, in combination: a housing; speedometer means in said housing; a carriage operatively connected with and movable by said speedometer means; means for guiding said carriage in said housing; a first and a second recording stylus operatively connected for movements with said carriage; a disc in said housing continuously rotating at a constant low angular speed and in contact with said first stylus whereby the latter records on the disc a curve indicative of the speeds measured by said speedometer means; a receptacle removably received in said housing and having an aperture; an endless band in said receptacle; means operatively connected with said band for advancing same in an endless path at a higher variable speed proportional with units of distance covered by the vehicle; said second stylus extending through said aperture and contacting said band for recording thereon a curve indicative of the speeds measured by said speedometer means; and means mounted in said receptacle and in contact with said band for erasing therefrom said last mentioned curve.

12. A tachograph for an automotive conveyance comprising, in combination: a housing; a speedometer in said housing; a first recording member operatively connected with and movable by said speedometer; a record receiving element in said housing advancing at a first speed and in contact with said first recording member whereby the latter records thereon a curve indicative of speeds measured by said speedometer; a receptacle removably received in said housing and defining a first and a second aperture; a pair of rollers installed in said receptacle; a record receiving endless band mounted for travel about said rollers; a second recording member connected for movements with said first recording member and extending through said first aperture into contact with said band; means connected with at least one of said rollers and extending from said receptacle for advancing the band at a second speed; an erasing member pivotally mounted in said receptacle and contacting the band at a point adjacent to said second recording member for wiping off the recordings made by said second recording member when the band is advanced about said rollers and toward said erasing member; means in said housing extending through the second aperture for urging said erasing member into contact with the band when the receptacle is received in said housing; and resilient means in said receptacle for automatically moving the erasing member away from the band when the receptacle is removed from said housing.

13. A tachograph for an automotive conveyance comprising, in combination: a housing; a speedometer in said housing; a first recording member operatively connected with and movable by said speedometer; a record receiving element in said housing advancing at a first continuous speed and in contact with said recording member whereby the latter records thereon a curve indicative of speeds measured by said speedometer; a receptacle removably received in said housing and defining a first and a second aperture; a pair of parallel rollers rotatably installed in said receptacle; a record receiving strip mounted for travel about said rollers; a second recording member connected for movements with said first recording member and extending through said first aperture into contact with said strip; means connected with at least one of said rollers and extending from said receptacle for advancing the strip at a second speed; means contacting said strip when said receptacle is inserted in the housing for erasing recordals made thereon by said second recording member when the strip is advanced about said rollers and toward said last mentioned means; releasable arresting means in said receptacle for preventing rotation of said rollers when the receptacle is removed from said housing; and means in said housing operatively connected with said arresting means through said second aperture for releasing the arresting means when the receptacle is inserted into said housing.

14. A tachograph for an automotive conveyance comprising, in combination: a housing; a speedometer in said housing; a first recording member operatively connected with and movable by said speedometer; a record receiving element in said housing advancing at a first speed and in contact with said recording member whereby the latter records thereon a curve indicative of speeds measured by said speedometer; a receptacle removably received in said housing and defining a first and a second aperture; a pair of parallel rollers rotatably installed in said receptacle; a record receiving strip mounted for travel about said rollers; a second recording member connected for movements with said first recording member and extending through said first aperture into contact with said strip; means connected with at least one of said rollers and extending from said receptacle for advancing the strip at a second speed; releasable arresting means in said receptacle for preventing rotation of said rollers when the receptacle is removed from said housing; means in said receptacle for erasing recordals made on said strip by the second recording member when the strip is advanced in a direction about said rollers and toward said last mentioned means being connected with the arresting means in such manner as to contact the strip when the arresting means is released and to move away from the strip when said arresting means prevents rotation of the rollers; and means in said housing operatively connected with said arresting means through said second aperture for releasing the arresting means when the receptacle is inserted into said housing.

15. A tachograph for an automotive vehicle comprising, in combination: a housing; a speedometer in said housing; a first recording member operatively connected with and movable by said speedometer; a record receiving element in said housing continuously driven at a first low constant speed and in contact with said recording member whereby the latter records thereon a curve indicative of speeds measured by said speedometer; a receptacle removably installed in said housing and having an aperture; a record receiving endless band in said receptacle driven at a second variable speed proportionate with the distances covered by the vehicle; a second recording member connected with said first recording member and extending through said aperture into contact with said band for recording thereon a second curve; locking means for releasably retaining the receptacle in said housing; and means in contact with said band when the receptacle is installed in said housing for erasing said second curve from the band.

16. A tachograph for an automotive vehicle comprising, in combination: a housing; a speedometer in said housing; a first recording member operatively connected with and movable by said speedometer; a record receiving element in said housing continuously driven at a first constant low speed and in contact with said recording member whereby the latter records thereon a curve indicative of speeds measured by said speedometer; a receptacle removably installed in said housing and having an aperture and an extension defining a socket; a record receiving endless band in said receptacle driven at a second variable speed proportionate with the distances covered by the vehicle; a second recording member connected with said first recording member and extending through said aperture into contact with said band for recording thereon a second curve; locking means comprising a spring biased member mounted in said housing and extending into said socket for releasably retaining the receptacle in said housing; and means in contact with said band when the receptacle is installed in said housing for erasing said second curve from the band.

17. A tachograph for an automotive vehicle comprising, in combination: a housing; a speedometer in said housing; a first recording member operatively connected with and movable by said speedometer; a record receiving element in said housing continuously driven at a first speed and in contact with said recording member whereby the latter records thereon a curve indicative of speeds measured by said speedometer; a receptacle removable installed in said housing and having an aperture and defining a socket; a record receiving endless band in said receptacle driven at a second variable speed proportionate with the distances covered by the vehicle; a second recording member connected with said first recording member and extending through said aperture into contact with said band for recording thereon a second curve; locking means comprising a member movable into and from said socket for releasably retaining the receptacle in said housing; and means in contact with said band when the receptacle is installed in said housing for erasing said second curve from the band.

18. A tachograph for an automotive vehicle comprising, in combination: a housing; a speedometer in said housing; a first recording member operatively connected with and movable by said speedometer; a record receiving element in said housing continuously driven at a first low constant speed and in contact with said recording member whereby the latter records thereon a curve indicative of speeds measured by said speedometer; a receptacle removably installed in said housing and having an aperture; a record receiving endless band in said receptacle driven at a second variable speed proportionate with the distances covered by the vehicle; a second recording member connected with said first recording member and extending through said aperture into contact with said band for recording thereon a second curve; locking means comprising a lead sealed wire for retaining the receptacle in said housing; and means in contact with said band when the receptacle is installed in said housing for erasing said second curve from the band.

19. A tachograph for an automotive vehicle comprising, in combination: a housing; a speedometer in said housing; a carriage in said housing operatively connected with and movable by said speedometer; a first recording member connected with said carriage; a record receiving element in said housing continuously driven at a first low constant speed and in contact with said recording member whereby the latter records thereon a curve indicative of speeds measured by said speedometer; a receptacle removably installed in said housing, said receptacle having an aperture and an extension defining a socket; a record receiving endless band in said receptacle; means operatively connected with said band for driving same at a second variable speed proportionate with the distances covered by the vehicle; a second recording member connected for movements with said carriage and extending through said aperture into contact with the band for recording thereon a second curve; means in contact with said band when the receptacle is installed in said housing for erasing said second curve; and a spring baised ball in said housing extending into said socket when the receptacle is installed in said housing.

20. A tachograph for an automotive vehicle comprising, in combination: a housing; a speedometer in said housing; a carriage in said housing operatively connected with and movable by said speedometer; a first recording member connected with said carriage; a record receiving element in said housing continuously driven at a first low constant speed and in contact with said recording member whereby the latter records thereon a curve indicative of speeds measured by said speedometer; a receptacle removably installed in said housing, said receptacle having an aperture and an extension defining a socket; a record receiving endless band in said receptacle; means operatively connected with said band for driving same at a second variable speed proportionate with the distances covered by the vehicle; a second recording member connected for movements with said carriage and extending through said aperture into contact with the band for recording thereon a second curve; means in contact with said band when the receptacle is installed in said housing for erasing said second curve; and a locking device in said housing, said locking device comprising a key and a bolt movable by said key into and from said socket.

21. A tachograph for an automotive vehicle comprising, in combination: a housing; a projection in said housing; a speedometer in said housing; a carriage in said housing operatively connected with and movable by said speedometer; a first recording member connected with said carriage; a record receiving element in said housing driven at a first speed and in contact with said recording member whereby the latter records thereon a curve indicative of speeds measured by said speedometer; a receptacle removably installed in said housing, said receptacle having a first aperture for reception of said projection and a second aperture; a pair of parallel rollers rotatably mounted in said receptacle; an endless band mounted for travel about said rollers; means in said housing operatively connected with one of said rollers for rotating same whereby to advance said band at a second speed; a toothed member connected with one of said rollers; a two-armed pawl pivotally mounted in said receptacle, one arm of said pawl having at least one tooth adapted to engage with said toothed member for arresting the band and the other arm abutting against said projection for holding the tooth away from said toothed member when the receptacle is installed in said housing;

resilient means operating between said pawl and said receptacle for constantly urging said one arm into a position in which the tooth engages with said toothed member; a second recording member connected for movements with said carriage and extending through said second aperture into contact with said band for recording thereon a second curve; and a roller mounted on said other arm and contacting the band when the last mentioned arm abuts against said projection for erasing the second curve from said band.

22. A tachograph for an automotive vehicle comprising, in combination: a housing; a speedometer in said housing; a first recording member operatively connected with and movable by said speedometer; a record receiving element in said housing driven at a first speed and in contact with said recording member whereby the latter records thereon a curve indicative of speeds measured by said speedometer; a receptacle removably installed in said housing and having an aperture; a record receiving endless means in said receptacle driven at a second speed; a second recording member connected with said first recording member and extending through said aperture into contact with said endless means for recording thereon a second curve; spring biased arresting means for said endless means mounted in said receptacle in such manner as to permit movements of said endless means when the receptacle is in said housing and to arrest said endless means when the receptacle is removed from said housing; and means so connected with said arresting means as to contact said endless means when the receptacle is in said housing for erasing said second curve from said endless means.

23. A tachograph for an automotive vehicle, comprising, in combination, speedometer means; first and second recording members connected with and movable by said speedometer means; first record receiving means in contact with said first recording member; first drive means for continuously rotating said first record receiving means at a low constant speed and adapted to be controlled by a clockwork; second record receiving means in contact with said second recording member; and second drive means for driving said second record receiving element at a variable speed proportionate with the distances covered by the vehicle.

24. A tachograph for an automotive vehicle, comprising, in combination, speedometer means; first and second recording members connected with and movable by said speedometer means; first record receiving means in contact with said first recording member; first drive means for continuously rotating said first record receiving means at a low constant speed and adapted to be controlled by a clockwork; second record receiving means in contact with said second recording member; and second drive means for driving said second record receiving element at a variable speed proportionate with the distances covered by the vehicle and higher than said constant speed.

25. A tachograph for an automotive vehicle, comprising, in combination, speedometer means; first and second recording members connected with and movable by said speedometer means; first record receiving means in contact with said first recording member; first drive means for continuously rotating said first record receiving means at a low constant speed and adapted to be controlled by a clockwork; second endless record receiving means in contact with said second recording member; second drive means for driving said second record receiving element at a variable speed proportionate with the distances covered by the vehicle; and erasing means for erasing the recordals made by said second recording means on said second record receiving means.

26. A tachograph for an automotive vehicle, comprising, in combination, a housing; speedometer means in said housing; first and second recording members in said housing connected with and movable by said speedometer means; first record receiving means in said housing in contact with said first recording member; first drive means for continuously rotating said first record receiving means at a low constant speed and adapted to be controlled by a clockwork; a receptacle removably mounted in said housing; second endless record receiving means in said receptacle in contact with said second recording member; second drive means for driving said second record receiving element at a variable speed proportionate with the distances covered by the vehicle; erasing means in said receptacle for erasing the recordals made by said second recording means on said second record receiving means; means in said housing for urging said erasing means into contact with said second record receiving means when said receptacle is located in said housing; and means in said receptacle for retracting said erasing means from said second record receiving means when said receptacle is removed from said housing.

References Cited in the file of this patent

UNITED STATES PATENTS

| | | |
|---|---|---|
| 1,078,138 | Frick | Nov. 11, 1913 |
| 1,252,102 | Erdle | Jan. 1, 1918 |
| 1,455,835 | Doolan | May 22, 1923 |
| 1,706,046 | Tisdale | Mar. 19, 1929 |
| 2,341,118 | Rodanet | Feb. 8, 1944 |
| 2,527,000 | Drake | Oct. 24, 1950 |
| 2,677,790 | Arps | May 4, 1954 |
| 2,750,575 | Doty et al. | June 12, 1956 |

FOREIGN PATENTS

| | | |
|---|---|---|
| 528,762 | Germany | July 3, 1931 |